Sept. 15, 1964    E. L. STEVENS    3,148,559
MACHINERY HOUSING
Filed March 8, 1962
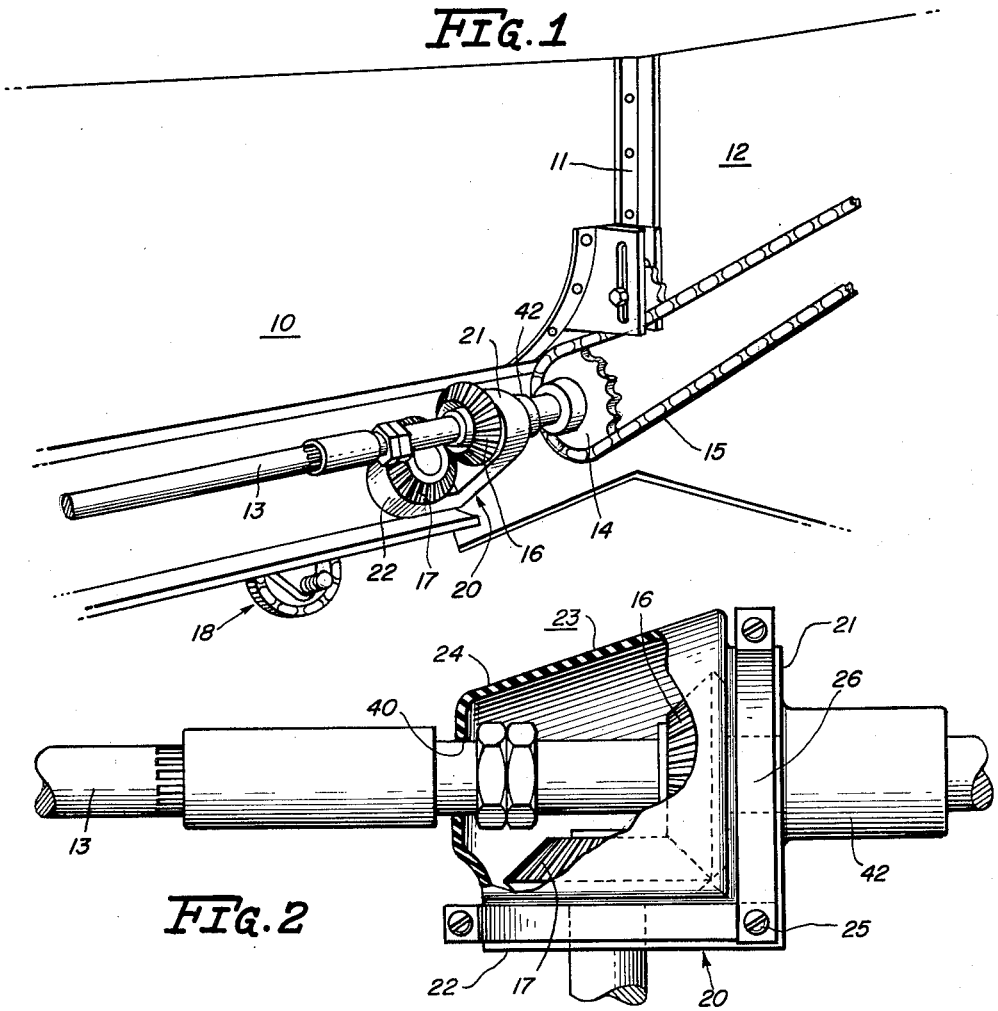
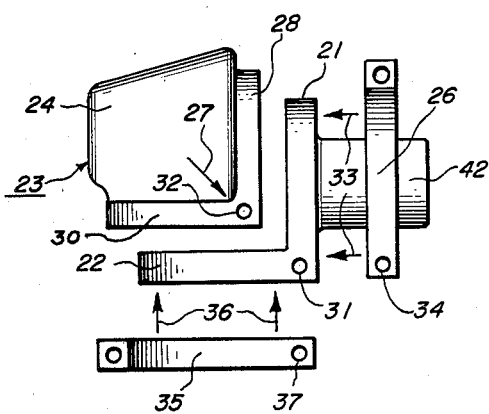
INVENTOR.
Edwin L. Stevens

United States Patent Office 3,148,559
Patented Sept. 15, 1964

3,148,559
MACHINERY HOUSING
Edwin L. Stevens, Rock Island, Ill., assignor to International Harvester Company, Chicago, Ill., a corporation of New Jersey
Filed Mar. 8, 1962, Ser. No. 178,409
1 Claim. (Cl. 74—606)

The present invention is directed to a housing for machinery, and more particularly a housing for meshing parts, such as gears, which is completely integral to retain lubrication and prevent the entry of dust and dirt, but nevertheless is flexible to accommodate pressure unbalances developed as the gears start, stop, or undergo other speed variations.

In many applications it is desirable to enclose a set of meshing gears to preclude the entry of dust or, in machines such as crop-treating apparatus, to prevent the entry of trash or crop material which will be ground up between the meshing gears and may foul the machinery. Further, if such a gear set is initially lubricated it is desired to retain the lubrication around the gears to decrease friction and thus provide longer wear. Accordingly, a rigid housing, such as a small casting which entirely encloses the gear box, has been used to both prevent the entry of dirt and trash and simultaneously to retain the lubricant within the casting. However, as the gears start, stop, or otherwise suddenly change speed a pressure unbalance is developed across the casting and therefore some provision must be made to accommodate this unbalance. One approach to this problem is the insertion of a "breather" plug directly in the cover or gear box housing. The breather plug must be made in such a way that, although atmospheric pressure unbalances are transmitted therethrough, there is no escape for the lubricant through the same orifice in which the pressure balancing is provided. Accordingly, various constructions of breather plugs have been provided, and it is evident that the process of providing a hole in the gear box housing, tapping the hole, providing the breather plug, and inserting the plug in the hole is itself a time-consuming operation.

It is therefore a primary object of the present invention to provide a gear box housing which is substantially more simple and economical to manufacture and utilize than are the prior art devices.

An important object of the invention is to afford assembly of the gears easily and conveniently in an open housing, and thereafter install a flexible covering over the gears and housing to retain lubricant around the gears and exclude dirt.

It is a more specific object of the invention to provide a gear box housing which both prevents the entry of dirt, trash, and other foreign substances into the vicinity of the meshing gears and simultaneously accommodates the pressure unbalances developed as the gears change speed, without the provision of any orifice or breather plug in the housing itself.

The foregoing and other objects of the invention are realized, in a preferred embodiment, by providing a housing of flexible material, such as rubber. The main portion of the housing is dome-shaped and terminates in a pair of U-shaped portions which extend at substantially right angles to each other. Straps are provided to secure the U-shaped portions to a bracket or other support means which also supports or adjoins the meshing gears, thereby to provide a single integral housing which positively precludes the entry of dirt or any foreign particles into the area of the meshing teeth while retaining the lubricant adjacent the gears. At the same time, when there is a start, stop, or other sudden speed change of the gears, the pressure unbalance thus created is readily accommodated by flexure of the housing without any damage to the housing and without imposing any load on the gears or the driving means.

The best mode contemplated for carrying out the invention will now be described. To enable those skilled in the art to make and use the invention, such description is set forth in connection with the accompanying drawings, in the several figures of which like reference numerals identify like elements, and in which:

FIGURE 1 is a perspective illustration showing a pair of meshing gears with no protective housing;

FIGURE 2 is another perspective illustration, taken at a different angle than is FIGURE 1, and illustrating a flexible housing constructed in accordance with the inventive principles; and FIGURE 3 is a diagrammatic view useful in explaining the positioning of the flexible housing over the meshing gear arrangement.

In FIGURE 1, a portion of a corn head for attachment to a combine is illustrated, and specifically a portion of the curved sheet metal housing 10 behind the snapping rolls and transverse auger, with a right-angle member 11 providing for connection of housing 10 with one side of the feeder housing 12. Drive energy is provided to the different operating parts of the corn head through the rotation of a shaft 13, on which a sprocket 14 is affixed and chain 15 is driven thereover to provide rotation of shaft 13. A bevel gear 16 is affixed to shaft 13 and positioned in meshing engagement with another bevel gear 17, which transmits rotary motion through a safety clutch 18 to one set of the snapping rolls (not visible).

Also shown in FIGURE 1 is a right-angle rigid gear case base 20 which provides support and alignment for the shafts on which bevel gears 16 and 17 are affixed. That is, gear case 20 comprises a first portion 21, the outer periphery of which is generally U-shaped, and another portion 22 extending at right angles to portion 21. Shaft 13 passes through the center of the first portion 21, and the shaft on which gear 17 is affixed passes through portion 22. Gear case 20 is affixed by riveting, welding, or other means to the supporting structure of the corn head, or this gear case may be an integral portion of a supporting member.

In accordance with the inventive teaching, a flexible housing 23 is provided and positioned over meshing bevel gears 16 and 17 as shown in FIGURE 2. The main portion of the flexible housing is referenced by numeral 24, and one collar portion 28 (FIGURE 3) of the housing is affixed by a screw assembly 25 and a pair of strap members 26 (only one of which is visible in FIGURE 2), joined at the top by a conventional nut-and-bolt fastener arrangement, over portion 21 of gear case 20.

The fastening of the housing over the gear case and gears is best illustrated in FIGURE 3. It is noted that adequate lubricant is placed in the housing before it is installed. Flexible housing 23 is assembled over shaft 13, with aperture 40 of the housing riding on shaft 13 and providing a seal at this opening. The housing is moved in the direction of arrow 27 until the collar portions 28 and 30 of the housing fit over portions 21 and 22, respectively, of gear case 20, as indicated by alignment of aperture 32 in the flexible housing with aperture 31 in the gear case. The various closure means are then affixed. That is, strap 26 is then moved as indicated by arrows 33 adjacent extension 42 of the gear case until aperture 34 is positioned in alignment with apertures 31 and 32, and a similar strap is positioned on the other side of gear case 20 and the two straps are then secured together at the top by a conventional nut-and-bolt assembly, as indicated in FIGURE 2. Strap 35 is then moved upwardly as indicated by arrows 36 until aperture 37 is in alignment with aperture 31 in the gear case, and a strap similar to strap 35, but not visible in FIGURE 3, is positioned on the other side thereof, and joined to strap 35 in the same manner as straps 26 are assembled with a nut-and-bolt arrangement. Thus, after the flexible housing is positioned over the gear case, and the two separate strap assemblies are affixed over the respective collar portions 28 and 30 of the housing, a single nut-and-bolt fastener arrangement 25 is passed through the central aperture 31 of the gear case and 32 of the flexible housing, and likewise through the respective apertures (e.g., 34 and 37) at the extremities of the straps, thereby to securely seal the flexible housing against the gear case and provide a completely airtight and dirt-free atmosphere within the housing.

As the bevel gears 16 and 17 are started or stopped, a pressure unbalance is developed, and in accordance with the inventive principles this unbalance is accommodated by flexing of housing 23. Thus there is no need to provide an orifice or a vent to the atmosphere, which vent itself must include some sort of blockage to prevent the throwing out of the lubricant from the interior of the housing to the atmosphere. The inventive structure has been found simple and economical to manufacture, easy to install, and rugged in operation. Use of the invention greatly simplifies installation of a gear set in an open gear case, and the flexible housing is then installed to exclude impurities and retain the lubricant around the gears. The flexible material should be resistant to oil, which is present in most lubricants.

While only a particular embodiment of the invention has been disclosed and illustrated, it is apparent that modifications and alterations may be made therein. It is therefore the intention in the appended claim to cover all such modifications and alterations as may fall within the true spirit and scope of the invention.

What is claimed is:

A gear casing for use with meshing gears carried on shafts which effect air movement and thus develop pressure unbalances responsive to speed changes of the meshing gears, the improvement which comprises:
  a rigid base having a pair of sides arranged at an angle to each other, the outer peripheral edges of each side being generally U-shaped,
  said sides having support means thereon for supporting the gear shafts,
  a flexible housing complementing said rigid base to form a complete enclosure for the meshing gears to retain lubricants around the meshing gears and to prevent the entry of dirt and other foreign particles,
  said flexible housing including a pair of U-shaped collar portions arranged at an angle to each other and corresponding in size to said U-shaped peripheral edges of said sides, and a dome-shaped portion interconnecting said U-shaped collar portions to provide an airtight enclosure for the meshing gears, said housing being formed of flexible material to accommodate pressure unbalances developed as said gears are started and stopped,
  and clamping means for securing the U-shaped collar portion of said flexible housing to the outer peripheral edges of said rigid base, to provide an airtight seal for the meshing gears and to accommodate said pressure unbalance by flexing of the flexible housing material.

References Cited in the file of this patent
UNITED STATES PATENTS
2,903,840    Teupel et al. _____ Sept. 15, 1959